SELF-THREADING TAKE-UP REEL

Filed Jan. 14, 1965

INVENTOR.
ABRAHAM A. GOLDBERG

BY

Brumbaugh, Free, Graves & Donohue his ATTORNEYS 3,312,407
Patented Apr. 4, 1967

3,312,407

SELF-THREADING TAKE-UP REEL

Abraham A. Goldberg, Stamford, Conn., assignor to Columbia Broadcasting System, Inc., New York, N.Y., a corporation of New York Filed Jan. 14, 1965, Ser. No. 425,580
12 Claims. (Cl. 242—55.12)

This invention relates to take-up reels for strips of material such as sound recording tapes, movie film, and the like and, more particularly, to a take-up reel which automatically captures the strip to be wound thereon.

In apparatus in which a strip is wound on a spool or reel, such as recording and reproducing devices for sound tape, movie film and the like, it is often desirable to use a self-threading take-up reel to facilitate the operation of the apparatus. In some devices, for example, the location of the take-up reel may be somewhat inaccessible, making manual loading of the take-up reel difficult. Moreover, reproduction mechanisms which are threaded automatically by push-feeding the leader usually require automatic capture of the leader by the take-up reel. For proper loading of the take-up reel, the leader, after being captured, must be wound tightly onto the hub of the take-up reel. Additionally, the leader should release smoothly at the completion of a rapid rewind.

A variety of devices for automatically threading strip materials on take-up reels have been suggested, but they either have been restricted to special applications or have been mechanically complicated and cumbersome. For example, one type of reel for movie projectors employs a guide chute which directs the film, after threading it through the feeding mechanism, to a slotted hub. Reels for magnetic tape machines may utilize a mechanical clamp which is tripped at the proper instant and engages the end of the tape to the hub. In another type of apparatus a stiff leader, preset to form an arc and attached to the end of the tape, is guided to the periphery of the take-up reel hub which has been provided with a surface having a high-coefficient of friction and designed to frictionally engage the free end of the leader.

The above-mentioned and other known take-up reels do not entirely satisfy the need for a simple, reliable take-up device which may be used with a variety of reproducing apparatuses without any substantial alteration. Some known reels, although reliable, are complicated and, moreover, require a special attachment or mechanism on the machine with which a take-up reel is used.

The above-mentioned and other disadvantages of presently known take-up reels are overcome, in accordance with the invention, by a novel and improved self-threading take-up reel comprising a hub, flange means on the hub defining a space for receiving the strip of film, tape or the like to be wound thereon, and at least one member for capturing the strip, the member preferably comprising an arm extending generally outwardly from the hub and having a portion movable between a first position in which that portion projects into the strip receiving space and a second position substantially externally of the space. The strip to be wound onto the reel is provided with at least one portion adjacent the lead end thereof which is adapted to be engaged by the arm. The arm then draws the strip inwardly into engagement with the hub and wraps it around the hub upon rotation of the reel. Preferably, several arm engaging portions are provided on the strip, disposed so that at least two revolutions of the reel occur before the arm releases the strip by being moved out of the strip receiving space by engagement of the edge of the strip therewith. Thereafter, the frictional engagement between the strip and the hub is sufficient to enable it to be wound onto the reel in the usual manner.

For a better understanding of the invention, reference may be made to the following detailed description of several exemplary embodiments, taken in conjunction with the accompanying drawings, in which.

Figures 1, 2:
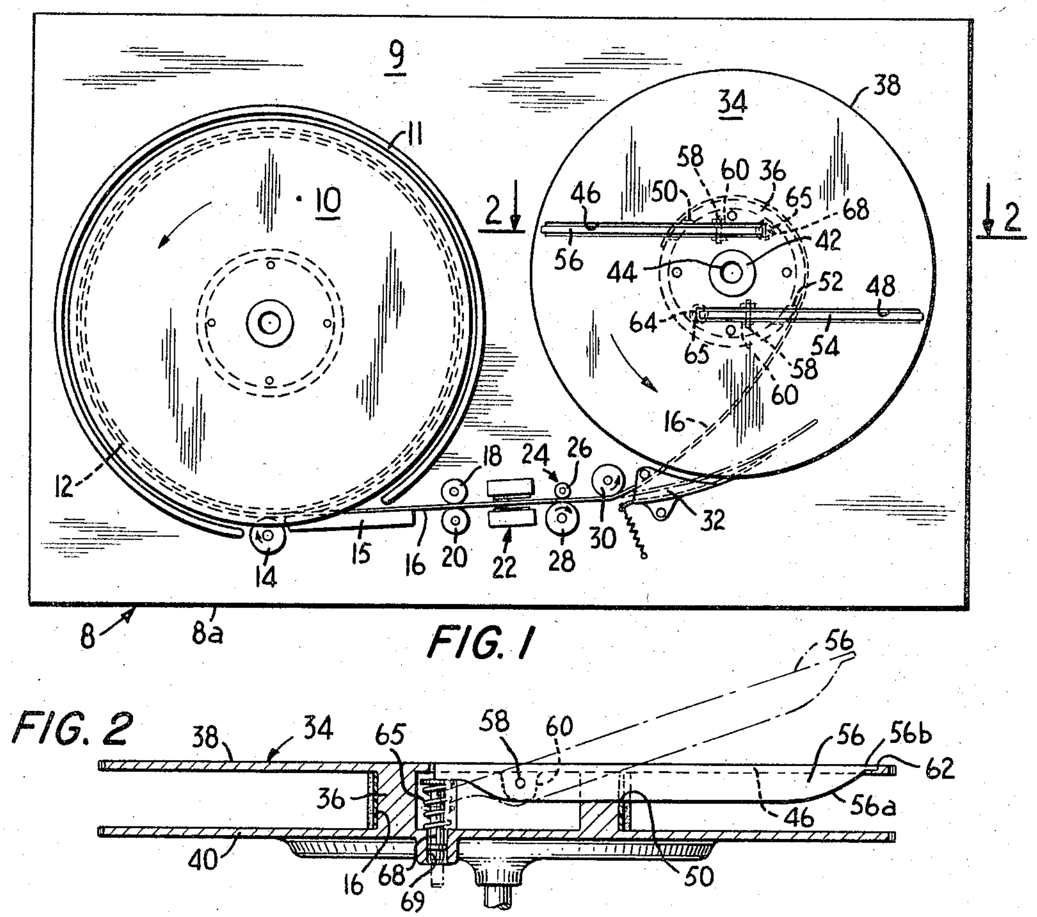
FIGURE 1 is a plan view of the tape deck mechanism utilizing one embodiment of a take-up reel according to the invention.
FIGURE 2 is a sectional view of the take-up reel shown in FIGURE 1, the view being taken generally along the line 2—2 of FIGURE 1 and in the direction of the arrows.

Illustrated in FIGURE 1 of the drawings is an exemplary apparatus for reproducing information carried on a strip and, particularly, a tape deck 8 for reproducing sound or video information recorded on a tape 12. It will be understood that the take-up apparatus of the invention is suitable for many other types of devices wherein a strip of material is wound on a reel or spool.

The tape deck 8 shown in FIGURE 1 includes a supply reel 10 which is rotatably received within a circular concentric guide 11 on the top plate 9 of a housing 8a for the device. The tape 12 on the supply reel 10 is initially fed from the reel by a drive wheel 14 which is normally positioned out of contact with the perimeter of the tape and is arranged to be moved into engagement with the tape by suitable means (not shown). When so engaged, the wheel 14 drives the reel counterclockwise (as shown by the arrow) and feeds the leading end of the tape against a substantially straight guide element 15 which extends generally tangentially with respect to the perimeter of the tape 12. As will be described in more detail below, the tape is preferably provided with a relatively stiff leader 16 at the leading end, the stiffness of the leader being sufficient so that it can be pushed along the drive path by the drive wheel 14.

The leader 16 is fed along the guide element 15 into the nip formed between a pair of guide wheels 18 and 20 and then into transducer means 22 for detecting the information carried on the tape and transmitting it to the reproducing and amplifying apparatus (not shown) of the device. Next, the leader is fed into a main drive 24 which consists of a driven capstan 26 and a pressure roller 28. The roller 28 holds the tape in frictional engagement with the capstan 26 which drives it, and once the leader 16 is engaged by the capstan and pressure roller drive 24, the drive wheel 14 for initially feeding the leader 16 is disengaged from the perimeter of the tape on the supply wheel; hereafter, the leader and tape are driven by the capstan alone.

The leader 16 is next fed along the edge of an idler wheel 30 and against the inner edge of a curved guide 32 which directs the end of the leader into a take-up reel 34.

The take-up reel (referring to FIGURES 1 and 2) includes an annular hub 36 about which the leader and tape are to be wound and spaced-apart flanges 38 and 40 defining a tape receiving space. At the cener of the reel is a mounting sleeve 42 for receiving a spindle 44 on the tape deck 8 by which the reel is adapted to be rotated in the direction of the arrow. The speed of rotation is preferably made such that the rate of linear movement of the perimeter of the reel is slightly greater than the speed of the tape leader 16.

Formed in the upper flange 38 of the reel 34 are two slots 46 and 48 which extend in generally opposite directions from a point within the reel hub 36, and slots 50 and 52 are formed axially in the hub 36 at the points of intersection between it and the slots 46 and 48. The slots 46 and 48 form an angle of approximately 60° with a tangent to the hub extending through and from the points of intersection in the direction of rotation of the reel 34. The slots extend nearly to the perimeter of the flange 38 and receive arms 54 and 56, each of which is pivotally mounted by a pin 58 on downwardly extending brackets 60 provided on the lower surface of the upper flange 38.

As shown in FIGURES 1 and 2, the arms 54 and 56 are generally straight, and they may be made of any suitable material. The outermost lower end 56*a* of each of the arms 54 and 56 is curved upwardly and the end includes a small projection 54*b*, 56*b* which is received in a recess 62 formed in the reel flange adjacent the outer end of the slots. In some embodiments the arms 54 and 56 are normally retained in the downward position (illustrated by the solid lines) by gravity, with the projections 54*b*, 56*b* engaged in the respective recesses 62, but when a take-up reel, according to the invention, is used in a position other than substantially horizontal, as may be the reel of FIGURE 2, then a spring or other resilient means can be provided to urge the arm downwardly to the position illustrated in FIGURE 2.

Actuating pins 64, 68 are slidably received in cylindrical channels 66, 69 and biased by a spring 65 against the underside of the arms 54, 56 near the hub end thereof. The pins serve a twofold purpose: they urge the arms 54, 56 in the downward position when the reel is empty, and they operate as actuators to select the "play" or other mode after threading of the reel has been completed, in a manner to be explained hereinafter.

Figure 3:
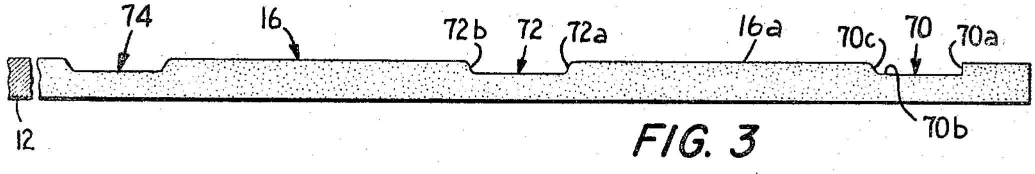
FIGURE 3 is a plan view of a tape leader for use with the take-up reel.

Referring now to FIGURE 3, the leader 16 of the tape includes a forward notch 70 located a short distance from the leading end. The notch 70 is relatively elongated and has a forward edge 70*a* which is perpendicular to the base 70*b* and a rearward edge 70*c* which is inclined outwardly with respect to the base 70*b*. The intersections between the rearward edge 70*c* and the base 70*b* of the notch 70 and also the edge 16*a* of the leader are slightly rounded.

Spaced at a distance from the forward notch 70 approximately equal to one-half the circumferential dimension of the hub 36 of the take-up wheel 34 is a second notch 72 which is substantially the same as the forward notch 70, except that both the forward and rearward edges 72*a* and 72*b* are inwardly convergent with respect to one another and are rounded as in the manner of the rearward edge 70*c* of the forward notch 70. A third notch 74, identical to notch 72, appears a like distance rearward of notch 72.

Referring again to FIGURE 1, the leader 16 is fed by the capstan and pressure roller drive 24 along the curved guide 32 into the position represented by the phantom lines. In this position, it is in the path of the outer ends of the arms 54 and 56 as the reel rotates. One of the arms quickly engages the leading edge 70*a* of the forward notch 70 in the leader 16. Upon further rotation of the take-up reel, the perimeter of which, as previously mentioned, is traveling at a slightly greater linear rate of speed than the speed of the end of the leader, the arm engaging the notch draws the end of the leader inwardly into engagement with the hub, as illustrated by the dotted lines in FIGURE 1. At the same time that the end of the leader is drawn inwardly, the arm will also be raised slightly because the dimension of the notch is not as great as the projection of the arm into the space between the reel flanges. Nevertheless, the arm continues to engage the notch 70. Inasmuch as the distance between the forward notch 70 and the third notch 74 in the leader is equal to the circumference of the hub, the arm remains in its lower position in engagement in the notch 70 for two complete revolutions of the take-up reel, the arm being accommodated by the third notch 74 during the second revolution of the reel.

Meanwhile, the other arm has been accommodated by the second notch 72. As the reel rotates further, the leader will of course also engage this arm. Because this arm is pivotally mounted, the upper edge 16*a* of the leader will, by camming action along the outer curved lower edge 56*a* of the arm, lift the arm into the uppermost position illustrated by the phantom lines in FIGURE 2. In a similar manner, after two complete revolutions of the take-up reel, the whole width of the leader is received in the flanges, and the arm which is still in engagement with the notches of the leader but in a slightly raised position, will be fully raised into the uppermost position. Thereafter, the remaining portion of the leader and then the tape are wound onto the take-up reel in the usual manner, both arms 54 and 56 now being in their fully raised positions.

When threading is nearly complete, after one and one-half revolutions of the take-up reel, the second, non-engaging arm is in its raised position, and the inner portion of the arm bears on the actuating pin 68, causing the pin to protrude below the lower flange 40, as indicated by the phantom lines in FIGURE 2. A deck, such as the type shown in FIGURE 1, may be equipped with a mode-selective latch (not shown) extending upwardly through the deck 9. In the apparatus illustrated in FIGURE 1, such a latch is in a position for engagement by either of the downwardly extending pins 64, 68 when the threading, or loading, mode is selected. As the reel rotates and after one of the pins has been extended by the lifted arm, the pin engages the latch, which is then "tripped" to disengage the drive wheel 14 and automatically actuate the "play" or other mode, as the case may be.

It will be observed that at the end of a rewinding of the tape the leader is readily released from the reel following a sequence of events that is the reverse of those involved in the threading the leader on the reel. After the leader has been released from the reel, the arms 54 and 56 return by gravity and the spring-biased pins 64, 68 to their downward positions in readiness for another take-up operation.

Figure 4:
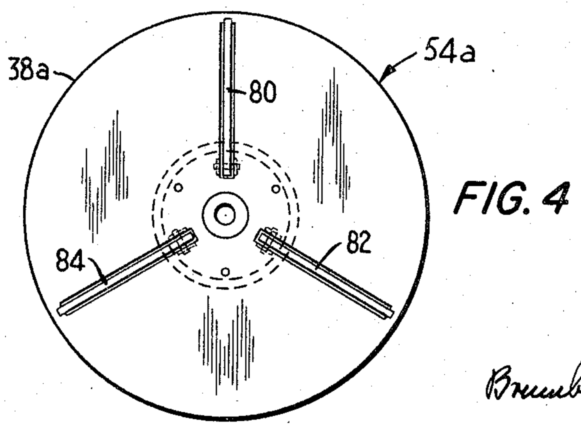
FIGURE 4 is a top view of another embodiment of the invention.

FIGURE 4 shows an alternative embodiment of the take-up reel 54*a* in which three arms 80, 82 and 84 extending substantially radially outward in the upper reel flange 38*a* are provided. While one arm will operate satisfactorily, it is generally desirable to provide two or three arms in order to capture the leader as soon as possible after it is fed into the tape-receiving space between the reel flanges.

In both embodiments described in detail herein, the arms are substantially straight, but it will be understood that the arms may also be curved. Moreover, the arms may be slidably rather than pivotally mounted in the reels.

Thus, there is provided, in accordance with the invention, a take-up reel which accomplishes reliable automatic threading, requires no complicated special or additional mechanisms to be attached to a device with which the reel is to be used, and can readily be adapted to a wide variety of devices.

The embodiments of the invention as described herein are merely illustrative and many modifications and variations of them may be made by those skilled in the art without departing from the spirit and scope of the invention. The invention, therefore, is intended to encompass all such modifications and variations as come within the scope of the appended claims.

I claim:

1. A self-threading take-up reel for a strip of tape, film or the like having at least one notch in the edge of the lead portion thereof comprising a hub, flange means on said hub defining a space for receiving the strip, and at least one member carried by the reel for capturing by hooking the lead portion of the strip, and thereafter drawing the strip into engagement with and wrapping it around the hub as the reel is turned, said member extending generally outwardly from said hub and having a portion including a camming surface movable between a first position in said strip-receiving space wherein said portion engages said notch and a second position substantially external to said space upon engagement of the edge of the strip with the camming surface so that radial movement of the strip in the strip-receiving space is not impeded once the strip has been wrapped around the hub.

2. A self-threading take-up reel for a strip of tape, film or the like having at least one notch in the edge of the lead portion thereof comprising a hub, flange means on said hub defining a space for receiving the strip, and a plurality of substantially rigid members carried by the reel and extending generally outwardly in substantially different directions from said hub, each of said members having a portion movable between a first position in said strip-receiving space and a second position substantially external to said space, whereby, upon rotation of said reel and advancement of said strip lead portion into said strip-receiving space, one of said arms in said strip receiving space is adapted to engage the notch in the strip and draw the strip inwardly into engagement with said hub, said strip being thereafter wrapped around the hub, said one arm being moved to the second position when the edge of said strip engages said one arm so that radial movement of the strip in the strip-receiving space is not impeded once the strip has been captured.

3. A reel according to claim 2 comprising means yieldably urging said arm into said first position.

4. A self-threading take-up reel for a strip of tape, film or the like having at least one notch at the lead portion thereof comprising a hub, at least one flange on said hub defining a space for receiving the strip, said flange having a pair of spaced-apart slots therein extending outwardly from said hub in generally opposite directions, a member in each of said slots having a portion for engaging the notch in the strip, said member drawing the strip inwardly into engagement with and wrapping it around said hub, each of said members being pivotally movable in said slot between a first position in said strip-receiving space and a second position substantially external to said space, and means yieldably urging said member into said first position.

5. Self-threading take-up apparatus for a strip of tape, film or the like comprising a reel having a hub and flange means on the hub defining a space for receiving the strip, a leader attached to the lead end of the strip and having a first notch in one edge near the end thereof and at least one second notch in said one edge longitudinally spaced from said first notch a distance substantially equal to the peripheral dimension of said hub, and at least one member engageable in said first notch for capturing said leader and drawing it inwardly into engagement with and wrapping it around said hub, said member extending generally outwardly from said hub having a portion movable between a first position in said strip-receiving space and a second position substantially external to said space.

6. In combination, a semi-rigid leader for a strip of tape, film or the like and a self-threading take-up reel having a member extending generally outwardly from the reel hub and selectively movable into and out of the space between the space for receiving the strip, said leader having a first notch in one edge near the leading end thereof for accepting the member, said notch having a longitudinal edge and a front edge substantially perpendicular to said longitudinal edge, and at least one second notch in said one edge of approximately the same depth as said first notch, said second notch being longitudinally spaced from said first notch a distance substantially equal to the peripheral dimension of the hub of the take-up reel.

7. In a self-threading reproducing or recording apparatus, a supply reel adapted to carry a strip of tape, film or the like wound thereon, a take-up reel of the type described having at least one member carried by the reel and selectably movable between a first position in a strip-receiving space and a second position substantially external to said space, a leader at the lead end of the strip having a notch in an edge thereof adapted to be engaged by the member in the first position upon rotation of the take-up reel and advancement of the leader into said space and thereafter wound on the take-up reel, drive means for advancing the strip and leader, means for guiding the strip and leader from the supply reel into said space, and transducer means for recording or detecting the information carried on the strip.

8. In a self-threading reproducing or recording apparatus, a supply reel adapted to carry a strip of tape, film or the like wound thereon, a driven take-up reel of the type described having at least one member carried by the reel and selectably movable between a first position in a strip-receiving space and a second position substantially external to said space, a leader at the lead end of the strip having a notch in an edge thereof adapted to be engaged by the member in the first position upon rotation of the take-up reel and advancement of the leader into said space and thereafter wound on the take-up reel, said member being moved to the second position by the engagement of the edge of the strip therewith, first drive means for engaging and advancing the outer convolutions on the supply reel, capstan drive means for advancing the strip or leader, means for guiding the strip from the supply reel and into said strip-receiving space, and transducer means for recording or detecting the information on the strip.

9. A combination according to claim 6 in which said leader has a third notch substantially identical to said second notch and spaced longitudinally equidistant from said first and second notches.

10. A self-threading take-up reel for a strip of tape, film or the like comprising a hub, flange means on said hub defining a space for receiving the strip, at least one member for capturing the lead portion of the strip, said member extending generally outwardly from said hub and having a portion movable between a first position in said strip-receiving space and a second position substantially external to said space, and actuating elements disposed internally of the periphery of said hub, said actuating elements slidably received in said flange means and cooperating with said members, whereby said actuating elements extend externally of said flange means when said member is in the second position.

11. In a self-threading reproducing or recording apparatus, a supply reel adapted to carry a strip of tape, film or the like wound thereon, a driven take-up reel of the type described having at least one member selectively movable between a first position in a strip-receiving space and a second position substantially external to said space, a leader at the lead end of the strip having a portion therein adapted to be engaged by the member upon rotation of the take-up reel and advancement of the leader into said space and thereafter wound on the take-up reel, first drive means for engaging and advancing the outer convolutions on the supply reel, capstan drive means for advancing the strip or leader, means for guiding the strip from the supply reel and into said strip-receiving space, transducer means for recording or detecting the information on the strip, means for disengaging said first drive means, and an actuating element in said take-up reel and cooperating with said member thereof, whereby said actuating element actuates said disengaging means when said member is in the second position.

12. In combination, a leader for a strip of tape, film or the like having at least one notch along the edge thereof, and a self-threading take-up reel comprising a hub, flange means on said hub defining a space for receiving the strip, and at least one member carried by the reel for capturing the lead portion of the strip, said member extending generally outwardly from said hub and having a portion movable between a first position within said strip receiving space for engaging the notch in the edge of the strip and a second position substantially external to said strip-receiving space, said member being movable to said second position upon rotation of the reel and engagement of said portion of the member with the edge of the strip.

References Cited by the Examiner

UNITED STATES PATENTS

| | | | |
|---|---|---|---|
| 2,964,593 | 12/1960 | Kleve | 242—55.12 X |
| 3,079,055 | 2/1963 | Chevallaz | 242—74 |
| 3,090,574 | 5/1963 | Doncaster et al. | 242—71.1 X |
| 3,208,682 | 9/1965 | Pastor et al. | 242—55.13 X |
| 3,208,688 | 9/1965 | Hanes | 242—74.2 |

FOREIGN PATENTS

| | | |
|---|---|---|
| 1,238,912 | 7/1960 | France. |
| 974,514 | 11/1964 | Great Britain. |

OTHER REFERENCES

German app. 1,156,439, pub. Oct. 31, 1963.

FRANK J. COHEN, *Primary Examiner.*

G. F. MAUTZ, *Examiner.*